J. F. PLACE.
ART OR PROCESS OF LIQUEFYING AND SEPARATING MIXED GASES.
APPLICATION FILED FEB. 17, 1911.
1,152,119.
Patented Aug. 31, 1915.
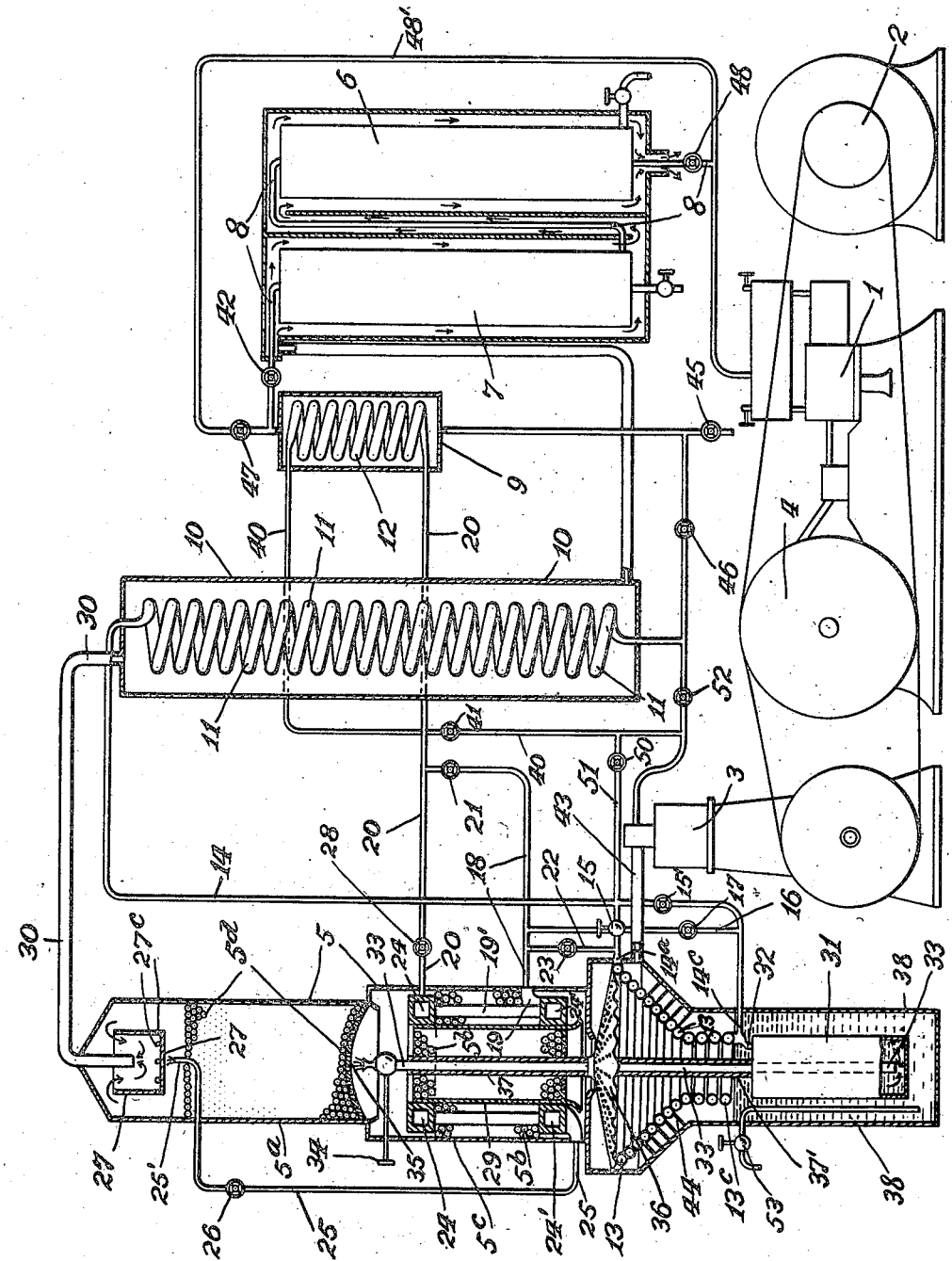
Attest:
Inventor:

UNITED STATES PATENT OFFICE.

JAMES F. PLACE, OF GLEN RIDGE, NEW JERSEY, ASSIGNOR TO AMERICAN AIR-LIQUEFYING COMPANY, OF NEW YORK, N. Y., A CORPORATION OF NEW YORK.

ART OR PROCESS OF LIQUEFYING AND SEPARATING MIXED GASES.

1,152,119.     Specification of Letters Patent.     Patented Aug. 31, 1915.

Application filed February 17, 1911. Serial No. 609,210.

*To all whom it may concern:*

Be it known that I, JAMES F. PLACE, a citizen of the United States, and resident of Glen Ridge, in the county of Essex and State of New Jersey, have invented certain new and useful Improvements in the Art or Process of Liquefying and Separating Mixed Gases, of which the following is a specification.

My invention relates to an improved art or process of liquefying and separating mixed gases into their component elements.

One object of my invention is to simplify and lessen the cost of apparatus required to carry out the process and reduce the cost of liquefaction and separation.

By my present process I make use of expansion against external resistance of a part of the mixed gas treated, so as to transform a part of the heat of the gas as expanded into recoverable external work.

This process is especially adapted to liquefaction of atmospheric air and its separation into its component parts oxygen and nitrogen.

By my improved process, when used for liquefying air and separating it into its component parts, oxygen and nitrogen, I utilize the liquid oxygen or liquid rich in oxygen as produced, after release from pressure, to sub-cool the oxygen liquid or liquid rich in oxygen before such release, as illustrated in my United States Patents No. 918,468 and No. 927,594. In this way excessive vaporization and loss of liquid when released from the high pressure at which it is produced to substantially atmospheric pressure, is avoided; for the liquid when released is practically cooled down to or below its boiling point at atmospheric pressure.

By my improved process I make use of my improved liquid deflector and cone coil shown in my application Serial No. 409,011 in combination with the ordinary rectifying column. This liquefying coil is preferably made in the shape of a frustum of an inverted cone, and of helically coiled pipes, the coils being soldered together so that no liquid can pass between the coils but is kept on the inside, dripping cataract like from one coil successively to another until the lower end of the cone is reached.

An especial feature of my invention when used for liquefying and separating the gases of atmospheric air is the fact that I make use of compressed nitrogen gas or a portion of the gaseous residue left after partial liquefaction of compressed air for expansion against external resistance in the expansion engine whereby a good part of the heat thereof is converted during expansion into external work.

In order that those skilled in the art may clearly understand and make use of my invention, I will describe my improved process as illustrated by the accompanying drawing, in which I show in diagrammatic form the different parts of an improved apparatus, whereby with suitable mechanism the process may be availed of.

In the drawing at the numeral 1 I show an ordinary 3-stage air compressor, capable of compressing to suitable pressure and intercooling and finally cooling to ordinary normal temperature air or other gases or gaseous mixtures, being driven by the electric motor 2, or some other source of power.

At 3 I show an air expansion engine, which may be of the reciprocating type as shown, or a turbine, being belted to the flywheel 4 of the compressor, so as to transmit its power to and do external work thereon.

At 5 is represented in vertical section a rectifying column, such as ordinarily used in alcohol or other distillation, but being constructed in this instance so as to be especially adapted to hold the necessary parts for the partial liquefaction and distillation of atmospheric air.

At 6 and 7 I show two drums in elevation, one (6) containing calcium chlorid, for absorbing moisture, and calcium chlorid brine for catching dust, etc., and the other (7) containing caustic potash for absorbing moisture and carbonic acid gas, from the compressed air or other mixed gas, as delivered from the compressor (1) through the pipes 8.

At 9 I show a freezing drum, and at 10 an interchanger drum, both in vertical section, the latter containing a high pressure counter-current coil pipe 11, and the first containing a high-pressure moisture freezing coil pipe 12, which will be referred to later on. The counter-current compressed air coil 11 delivers to the liquefying cone conduit or primary liquefier 13 through the connecting pipe 14. The lower end of the liquefying cone conduit or primary liquefier is extended down by several coils as indicated at 13ᶜ which are slightly separated as is clearly shown. The connecting pipe 14 has preferably two deliveries to the liquefying cone coil (13), one at 14ᵃ near the top and one at 14ᶜ near the bottom, through the valves 15 or 15′, respectively. When the compressed air is delivered to the liquefying cone 13, through valve 15 (which is the preferred inlet) valve 15′ is closed and the compressed air passes down through the cone, and that which is not liquefied passes out through pipe 14ᶜ and up through the pipe 16 and valve 17 into pipe 18, which delivers to the condenser 19, and also to pipe 20 through valve 21. In case the compressed air or any part of same is delivered to the bottom of the liquefying cone (13) through valve 15′ and pipe 14ᶜ, then valves 15 and 17 are closed, and valve 23 is opened, and the unliquefied air from the liquefying cone (13) passes out through pipe 22 and valve 23 into pipe 18 and is delivered to the condenser 19, same as before. This condenser (19) I make preferably of top and bottom ring conduits 24 and 24′, and several upright connecting pipes 19′, these upright pipes being connected with both the upper and lower ring conduits; these tubes (19′) may be made in form of helical coils, the only requisite being that they shall connect with both the ring conduits 24 and 24′.

At 25 I show a liquid discharge pipe from the ring conduit 24′, controlled by valve 26, and at 20 a gas outlet from ring conduit 24; the pipe 25 delivers to the rectifying column 5 (near the top) through valve 26, and upwardly bent discharge nozzles 25′ so that the liquefied gas is discharged upward against the deflecting baffle member 27.

The upper part of the rectifying column 5, at 5ᵃ, and the middle part at 5ᶜ are filled preferably with aluminum balls 5ᵈ and 5ᵇ about the size of peas. The pipe 20 is connected with the upper ring conduit 24 through valve 28.

At 29 I have a non-conducing fiber tube, which separates the condenser 19 from the gases which pass up through the rectifying column.

At 30 is shown the rectifying column low-pressure discharge conduit or the nitrogen vapor and re-cooled expanded nitrogen gas outlet pipe, which delivers to the top of the counter-current interchanger drum 10.

Below the liquefying cone coil (13) I show a high-pressure liquefied gas tank 31 or high-pressure receiver for the liquefied gas, which liquefies in the liquefying cone and runs down by gravity through connecting pipe 32, and is collected in this receiver (31). A siphon outlet pipe 33, is fixed inside the receiver (31), its inlet being near the bottom, and which passes upward and discharges upwardly through valve 34 against the perforated plate 35, which separates the bottom of the upper compartment 5ᵃ of the rectifying column from the top of compartment 5ᶜ. This siphon pipe (33) which carries the liquefied gas collected in receiver 31, up through successively the liquefying cone 13, and the radially-grooved deflector 36 and compartment 5ᶜ of the rectifying column, is preferably inclosed in and insulated by the fiber tubes 37 and 37′.

At 36 is shown my improved radially corrugated or grooved liquefied gas rectifying deflector or spreader, having radial grooves for delivering the liquefied gas (which comes down through the column 5) from the peripheral edge of said deflector (36) to the top of the helical liquefying coils of the liquefying cone (13) inside the cone. Along the apexes of the raised portions or corrugations of the deflector 36 between the radial grooves upon the top side thereof I have provided numerous small holes which allow the ascending gases to pass up through the deflector and thereby condense the oxygen from such gases. The condensed oxygen drips or runs down while the nitrogen of such gases goes on up through the column 5 in a gaseous state, being augmented by the nitrogen vaporized from the liquid which is passing along the radial grooves of the said deflector.

The practically pure liquefied oxygen is collected in the low-pressure reservoir 38, surrounding the submerged high-pressure receiver 31, where it is still further rectified by sub-cooling the liquefied gas in the receiver (31), absorbing therefrom its latent heat of vaporization; and such vapor as may be thus produced in the reservoir 38 is also rectified and its oxygen condensed as it passes up through the deflector 36 and rectifying column 5.

I supply the expansion engine 3 with compressed gas from pipe 40, through valve 41. This compressed gas is drawn from either ring conduit 24′ through pipe 18 and valve 21 or ring conduit 24 through pipe 20 and valve 28 (preferably the latter), and being very cold it is passed through the coil 12 in the freezing drum 9, and is thereby re-heated or raised in temperature by cooling the compressed air as it is delivered from drum 7 into the freezing drum 9 through valve 42; the re-heated gas is then delivered to the expansion engine 3 through valve 41 and feed pipe 40, and is expanded therein, the heat it has taken up from the compressed air in the drum 9 being transformed into external work on the fly-wheel 4 of the air-compressor (1). In this way the initial temperature of the high tension gas as delivered to and immediately before expansion in the engine 3 may be regulated as desired, so that the temperature of the expanded gas delivered through conduit 43, may be maintained below the critical temperature of the compressed air in the liquefying cone 13. This cold expanded gas is given a helical course downward around the outside of the liquefying cone (13) by the helical partition plate 44. During the operation the coil 12 in the freezing drum 9 will get covered with frost (being the last residue of moisture in the compressed air treated), which may be melted and drawn off through drip cock 45, by closing air cocks 42, 46 and 48, and cocks 21, 28 and 41, and opening air cock 47; in this way, by shutting off the water from the final cooler of the compressor, hot air may be passed through the by-pass pipe 48' into the drum 9. By this improved construction, this method of getting rid of the accumulating frost, may be made use of any time without the disadvantage of stopping the operation of the mechanism—the engine being run empty temporarily by the compressor.

The operation of the mechanism or apparatus, whereby my improved process is availed of for the liquefaction of atmospheric air and its separation into its constituents oxygen and nitrogen, may be described as follows: Air is drawn into the compressor (1) and compressed and intercooled in the usual manner, to about 750 lbs. gage pressure. It is then finally water-cooled, and is passed through the drums 6 and 7, and dust, moisture, carbonic acid gas and other foreign substances removed therefrom. From thence it is passed through the freezing drum 9, where it is cooled to from 40° to 100° F. below zero, by the cold gas passed through the coils 12 in said drum. (The gas passed through this coil 12 is the unliquefied gas from the high-pressure liquefiers.) All moisture remaining in the compressed air is frozen out in passing through drum 9, and is deposited as frost on the outside of the coil 12. The pure, dry air is then conducted through valve 46 into the interchanger coils 11 in the interchanger drum 10 where it is cooled to about 180° F. below zero, by the cold expanded nitrogen gases from the rectifying column 5 delivered through discharging conduit 30. The cold compressed air, leaving the interchanger coils 11 passes into pipe 14, and enters the liquefying cone coil pipe 13) the primary liquefier) preferably through valve 15 and pipe 14ᵃ. (A portion, or all of the air may be admitted through valve 15' and pipe 14ᶜ.) Upon starting, valve 50 in cross pipe 51 is opened, and a part of the dry and pure compressed air is then delivered through coil 11 and pipe 14 and the by-pass 51 to the air-expansion engine 3, wherein it is expanded against external resistance, doing work on the fly-wheel (4) of the compressor, and its temperature falls corresponding to the amount of work done. This cold expanded air is then conducted into the rectifying column 5, and is passed around the liquefying cone coil 13, in the helical passage between the helical plates 44, and then passed between the lower coils (13ᶜ) and under same into the inside of the cone around the fiber tube 37' and up through the perforations in the rectifying deflector 36 (being cooled thereby), and finally up through the rectifying column and the discharge pipe 30 to the interchanger 10, where it cools the engine supply of compressed air passing through the coil 11. Very soon portions of the air in the liquefying coils 13 become liquefied and pass down through pipe 32 into the high-pressure receiver 31. When the receiver is full release-valve 34 is opened, and the liquid is forced upwardly through discharge pipe 33 and after discharging upwardly against the perforated plate 35, it falls down through or around the aluminum balls (5ᵇ) on to the radially-grooved rectifying deflector 36, and down over the inside surfaces (cataract-like) of the liquefying cone 13, absorbing its latent heat of vaporization from the compressed air in the cone coil. By the employment of a liquefying cone coil all parts of the liquid air are brought into indirect physical but in direct thermal contact with the compressed air to be liquefied. This is due to the fact that the liquid (rich in oxygen) in the form of a thin annular sheet drips over and in a direction at nearly right angles to the pipe or conduit carrying the compressed air which is being liquefied. The said liquid falls down by gravity cataract-like successively over the helical coils of the pipe or conduit containing the passing column of compressed air sought to be liquefied. This causes rapid fractional evaporation of the falling liquid air, and the vapor passes up through the fine perforations in the ridges or along the apex of the radial and upwardly extended corrugations between the grooves in the deflector 36. As this deflector is preferably made of sheet copper (which has great thermal conductivity) and as the grooves are filled with the later-condensed liquid air, the oxygen of the rising vapors becomes condensed and drips back; the rising gases become further rectified as they come in contact with the aluminum balls and descending liquid in the fiber tube 29. Valve 17 may now be opened (valve 23 remaining closed), and the unliquefied gases in the liquefying cone 13 then pass into the upper or secondary liquefier 19, through pipes 14ᵉ, 16 and 18. This secondary liquefier consists of the ring conduits 24 and 24' and numerous connecting pipes 19' in the annular space between the walls of the non-conducting fiber tube 29 and the outer wall 5ᶜ of the rectifying column. This annular space is open at the top and some of the cold liquid from the upwardly-delivering nozzle of valve 34, falls down around the liquefying tubes 19' and passes out under the lower end edges of the fiber tube 29, on to the top of deflector 36, and thus liquefies more or less of the unliquefied compressed gases in said tubes, (19'), and such liquefied gas drips down into the ring conduit 24'. From thence it is forced up through the siphon pipe 25 by opening valve 26, and is delivered through the upwardly-delivering nozzle 25' against the bottom of the protecting baffle 27, and then falls down through or around the aluminum balls $5^d$ in the upper part ($5^a$) of the rectifying column. This liquid being considerably colder than liquid oxygen, still further rectifies the vapors and unliquefied gases passing up through the rectifying column, by condensing to a liquid the last portions of all oxygen in the rising gaseous vapors, and replacing same by vaporized nitrogen from the liquefied gas as it falls down through or around the aluminum balls in both the upper and lower compartment of the rectifying column. This liquefied gas is practically all vaporized before it reaches the rectifying deflector 36. Valve 50 (which supplies the expansion engine with compressed air from pipe 14) may now be closed, and valves 21 or 28 (preferably the latter) and 41, be opened. Then the engine will be supplied from pipe 40 with compressed gas from the top of the secondary liquefier, which will pass through pipe 20 into and through coil 12 (in the freezing drum 9), where it is re-heated by cooling the compressed air in said drum, and freezing out the moisture therefrom, which will be deposited as frost on the outside of coil 12. The initial temperature of the compressed gas supplied to the engine, immediately before expansion therein, may be easily regulated by the degree of re-heating in drum 9, by regulating the amount of gas passed through the coil 12; any insufficiency of such supply, may be made up by opening valve 50 and taking some air from pipe 14, or by opening valve 52 and taking some warmer air from the supply pipe before it enters the interchanger. By thus taking air or gas of different temperatures, and properly regulating the speed of the engine, any desired initial temperature may be given the compressed gas supplied to and expanded in the engine; and in this way any terminal temperature desired may be given to the expanded gas in conduit 43, as exhausted from the expansion engine and delivered against the primary liquefier 13—the desirable point being to maintain a temperature of such expanded gases below the critical temperature of liquefaction of the high-pressure air in the liquefying cone.

By the cup-like construction of the baffle 27 at top of the rectifying column, the inlet to pipe 30 is protected, so that only gases (practically pure cold nitrogen gas) is permitted to escape through pipe 30; in the lower edges of this baffle cup (27) there are small drip holes ($27^c$) to let out any liquid which gets into the cup. The oxygen which collects in the reservoir 38 may be drawn off in liquid form through cock 53.

One special feature of my invention is that in sub-cooling (or cooling after liquefaction) of the liquid under high pressure in receiver 31, so that when it is released from pressure by valve 34 there is no vaporization, I utilize the latent heat of vaporization of the low-pressure liquid in reservoir 38 (which is taken from the liquid in receiver 31) when it is at the maximum (about 125 B. T. U.); and in partially liquefying the air in both liquefiers (13 or 19) such liquefaction is under a pressure at about the critical pressure, when there is no latent heat at all given out to neutralize the refrigerative effect—as clearly set forth in my U. S. Patents 918,468 and 927,594.

All of the parts of the apparatus having temperatures below the normal, I thoroughly insulate by materials of low thermal conductivity.

The expansion motor 3, may be a cut-off reciprocating engine, or a turbine, or any other mechanism that will expand compressed gas or gaseous mixtures against external resistance, and thereby transform portions of their heat into external work. I make no claim herein to the novel construction of this expansion engine, nor to any other parts of the apparatus as herein shown, as the same will form the subject-matter of another application.

The coils 11 and 12, and the primary and secondary liquefiers 13 and $13^c$ and 19 and 19' with the ring conduits 24 and 24', as well as receiver 31, are all made preferably of copper, so as to insure the maximum of thermal conductivity.

Having thus described my invention, what I claim as new and original and desire to secure by Letters Patent, is—

1. The art or process of liquefying and separating a gaseous mixture, which comprises compressing and cooling the mixed gas; delivering one portion of said compressed mixed gas to a liquefier, and another portion to an expansion engine, and expanding the same therein against external resistance; and then liquefying the gas in the liquefier while under compression by the combined refrigerative effect of the cold expanded gas exhausted from the engine, and liquefied gas previously liquefied in said liquefier but released from pressure—both said released liquefied gas and said cold expanded gas being conducted over said liquefier so as to absorb heat from but not in direct contact with the compressed gases being liquefied therein.

2. The art or process of liquefying atmospheric air which comprises compressing and cooling the air and partially liquefying the same, separating the liquefied from the unliquefied portion, and retaining the said unliquefied portion under compression and causing it to cool the compressed air before partial liquefaction thereof.

3. The art or process of liquefying air comprising the compressing and cooling of the air and causing partial liquefaction of the same under tension in a liquefier by the combined refrigerative effect of the released liquefied gas and expanded gaseous products of previous liquefaction flowing over said liquefier in contact with each other and in opposite directions.

4. The art or process of liquefying atmospheric air, which comprises compressing the air; partially liquefying a portion of such air while under compression; separating the cold unliquefied gas from the liquid thus obtained, and utilizing the refrigerative effect of the unliquefied gas while under compression to cool the compressed air to be treated.

5. The art or process of liquefying atmospheric air, comprising the compressing and cooling of the air, and causing partial liquefaction of the same under tension in a liquefier by the combined refrigerative effect of the released liquid and expanded gaseous products of previous liquefaction flowing over said liquefier.

6. The art or process of liquefying atmospheric air and separating the constituents thereof, oxygen and nitrogen, which comprises compressing and cooling the air, and subjecting the same to partial liquefaction in a plurality of liquefiers, the resultant liquid collected from the first liquefier being rich in oxygen and that from a successive liquefier being rich in nitrogen; separating the liquefied from the unliquefied portions; and finally withdrawing the unliquefied gaseous residue under tension and expanding the same, and utilizing the resultant refrigeration obtained thereby in causing partial liquefaction of further portions of compressed air as delivered to the primary liquefier.

7. The art or process of liquefying atmospheric air and separating the constituents thereof, oxygen and nitrogen, which comprises compressing and cooling the air, and subjecting the same to partial liquefaction under pressure; separating the liquefied from the unliquefied portions, and releasing the liquid obtained from pressure, and evaporating portions thereof, and expanding the unliquefied compressed gaseous residue; and finally utilizing the combined refrigerative effect of such evaporation and such expansion in partially liquefying further portions of compressed air.

8. The art or process of liquefying atmospheric air and separating the constituents thereof, oxygen and nitrogen, which comprises compressing and cooling the air, and subjecting the same to partial liquefaction under pressure in a plurality of liquefiers; separating the liquid obtained in each liquefier from the unliquefied gases, and releasing from pressure separately the liquids obtained in each liquefier, and evaporating portions thereof at substantially atmospheric pressure; withdrawing under tension all of the unliquefied gaseous residue from the liquefiers, and expanding the same to the low pressure of the evaporating liquid; and finally utilizing the combined refrigerative effect of such evaporation and such expansion in partially liquefying further portions of compressed air.

9. The art or process of liquefying atmospheric air and separating the same into its constituents, oxygen and nitrogen, which comprises compressing and cooling the air, partially liquefying the same, and separating under tension the liquid thus obtained from the unliquefied portion; sub-cooling said liquid by the liquid products of previous similar liquefaction, and finally releasing said sub-cooled liquid products from pressure, and causing separation of the constituents thereof by distillation.

10. The art or process of liquefying atmospheric air, and separating the same into its constituents, oxygen and nitrogen, which comprises compressing and cooling the air; partially liquefying the same under tension in a plurality of liquefiers; releasing from pressure the liquid products thus obtained, and expanding the gaseous residue; and finally causing separation of the constituents of the liquid obtained from said liquefier by distillation thereof.

11. The art or process of liquefying atmospheric air and separating the same into its constituents, oxygen and nitrogen, which comprises compressing and cooling the air; partially liquefying the same in a plurality of liquefiers under tension, and sub-cooling of the liquid products thus obtained while under pressure by the liquefied portions previously produced in a similar manner and released from pressure; releasing from pressure the said cooled liquid products of liquefaction and expanding the unliquefied gaseous residue; and finally causing separation of the constituents of the liquid collected from the respective liquefiers by distillation of said released liquid products.

12. The art or process of liquefying atmospheric air and separating it into its component parts, oxygen and nitrogen, which comprises the causing of a partial liquefaction thereof in a plurality of liquefiers, separating the liquid obtained in each liquefier from the unliquefied portion, releasing from pressure the liquids obtained in each liquefier and introducing the same into a rectifying column, and withdrawing the unliquefied portions from said liquefiers.

13. The art or process of liquefying atmospheric air and separating it into its component parts, oxygen and nitrogen, which comprises the causing of a partial liquefaction of the air in a primary liquefier, separating the liquid obtained in such liquefier from the unliquefied portion of gas, introducing the said unliquefied portion of gas into a secondary liquefier and causing partial liquefaction thereof therein, separating the liquid obtained in such secondary liquefier from the unliquefied portion of gas, and releasing from pressure separately the liquids obtained in said liquefiers, introducing the same into a rectifying column and evaporating portions thereof at substantially atmospheric pressure in thermal contact with the gases within the said liquefiers.

14. The art or process of liquefying atmospheric air and separating it into its component parts, oxygen and nitrogen, which comprises the causing of a partial liquefaction of the air in a primary liquefier, separating the liquid obtained in such liquefier from the unliquefied portion of gas, introducing the said unliquefied portion of gas into a secondary liquefier and causing partial liquefaction thereof therein, separating the liquid obtained in such secondary liquefier from the unliquefied portion of gas, and releasing from pressure separately the liquids obtained in said liquefiers, introducing the same into a rectifying column and evaporating portions thereof at substantially atmospheric pressure in thermal contact with the gases within the said liquefiers, and withdrawing under tension all the unliquefied gaseous residue from the secondary liquefier and expanding the same to the low pressure of the evaporating liquid.

15. The process of separating atmospheric air into oxygen and nitrogen which comprises compressing and cooling the air and liquefying a portion thereof in contact with a portion which is not liquefied and then subjecting both portions while under pressure to the cooling action of but not in physical contact with a liquid rich in oxygen released from pressure previously produced under pressure during the process, then separating the liquefied gases from the unliquefied and finally releasing the liquefied gases from pressure and expanding the unliquefied gaseous residue with production of recoverable external work.

16. The process of liquefying air and separating the oxygen from the nitrogen thereof which comprises compressing and cooling the air and then liquefying it while under pressure by bringing it in thermal but not physical contact with a descending or dripping liquefied gas released from pressure and being fractionally distilled or evaporated by heat drawn from the compressed air being liquefied.

17. The process of liquefying air and separating the oxygen from the nitrogen thereof which consists in compressing and cooling gaseous air, passing previously liquefied portions of air over said cooled compressed air in thermal but not in direct contact therewith, liquefying a portion of the compressed and cooled air in contact with a portion thereof which is not liquefied and separating the liquid thus obtained from the gaseous residue, and finally liquefying portions of said gaseous residue, separating the liquefied from the unliquefied portion and releasing this final liquid from pressure and expanding the final gaseous residue.

18. The process of liquefying and separating a gaseous mixture into its constituents which consists in compressing and cooling the same, partially liquefying the same while under compression, separating the liquefied from the unliquefied portions, partially liquefying the unliquefied residue, then employing the remaining portion of such unliquefied residue to cool other portions of air, thereafter expanding such remaining portion and using said expanded portion to assist in causing the partial liquefaction first referred to above.

Signed at New York city in the county of New York and State of New York this 3d day of February, A. D. 1911.

JAMES F. PLACE.

Witnesses:
 LAURA E. SMITH,
 M. GOLDSTEIN.